United States Patent
Hamouz et al.

[15] 3,672,137
[45] June 27, 1972

[54] MOWER SUPPORT AND LIFT LINKAGE

[72] Inventors: George J. Hamouz, Clarendon Hills; W. Robert Dalenberg, Hinsdale; James W. Zurek, Berkeley, all of Ill.

[73] Assignee: International Harvester Company, Chicago, Ill.

[22] Filed: Oct. 26, 1970

[21] Appl. No.: 84,256

Related U.S. Application Data

[63] Continuation of Ser. No. 725,725, May 1, 1968, abandoned.

[52] U.S. Cl. ............................................. 56/15.8, 56/16.3
[51] Int. Cl. ...................................................... A01d 35/26
[58] Field of Search ................... 56/15.9, 16.3, 15.7, 15.8

[56] References Cited

UNITED STATES PATENTS 3,357,165  12/1967  Thon ........................................ 56/16.3

Primary Examiner—Louis G. Mancene
Assistant Examiner—J. A. Oliff
Attorney—Floyd B. Harman

[57] ABSTRACT

A mounting assembly for adjustably supporting an implement from a riding lawn mower, the assembly comprising a parallel lift linkage mounted on the mower, a cutting unit suspended from the linkage, and a lever operatively connected to the linkage for varying the elevation of the cutting unit. The lift geometry of the lever relative the operator is such to provide a three-point force distribution opposing the lift force exerted on the lever.

1 Claim, 7 Drawing Figures

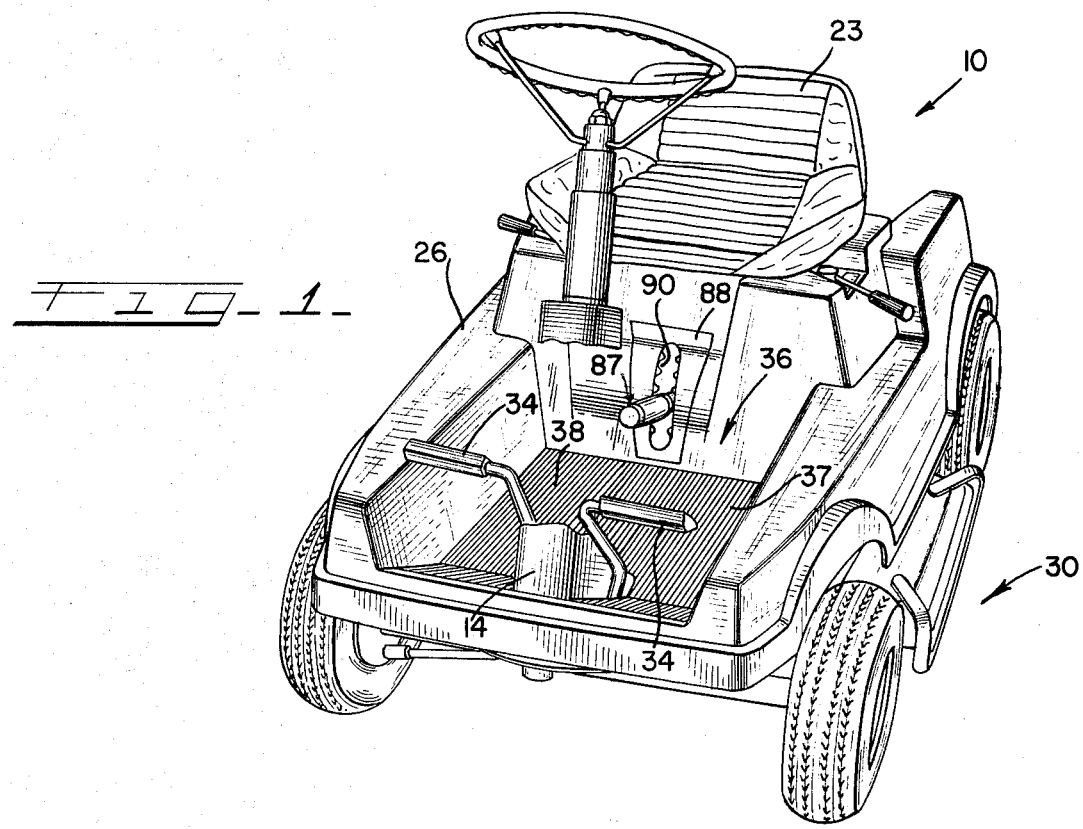
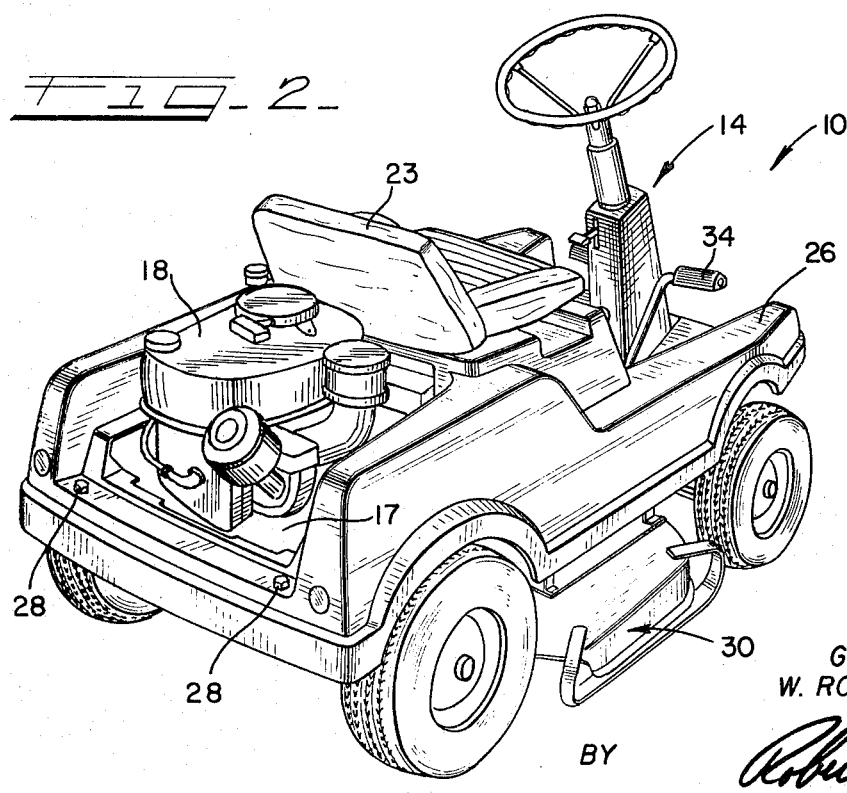

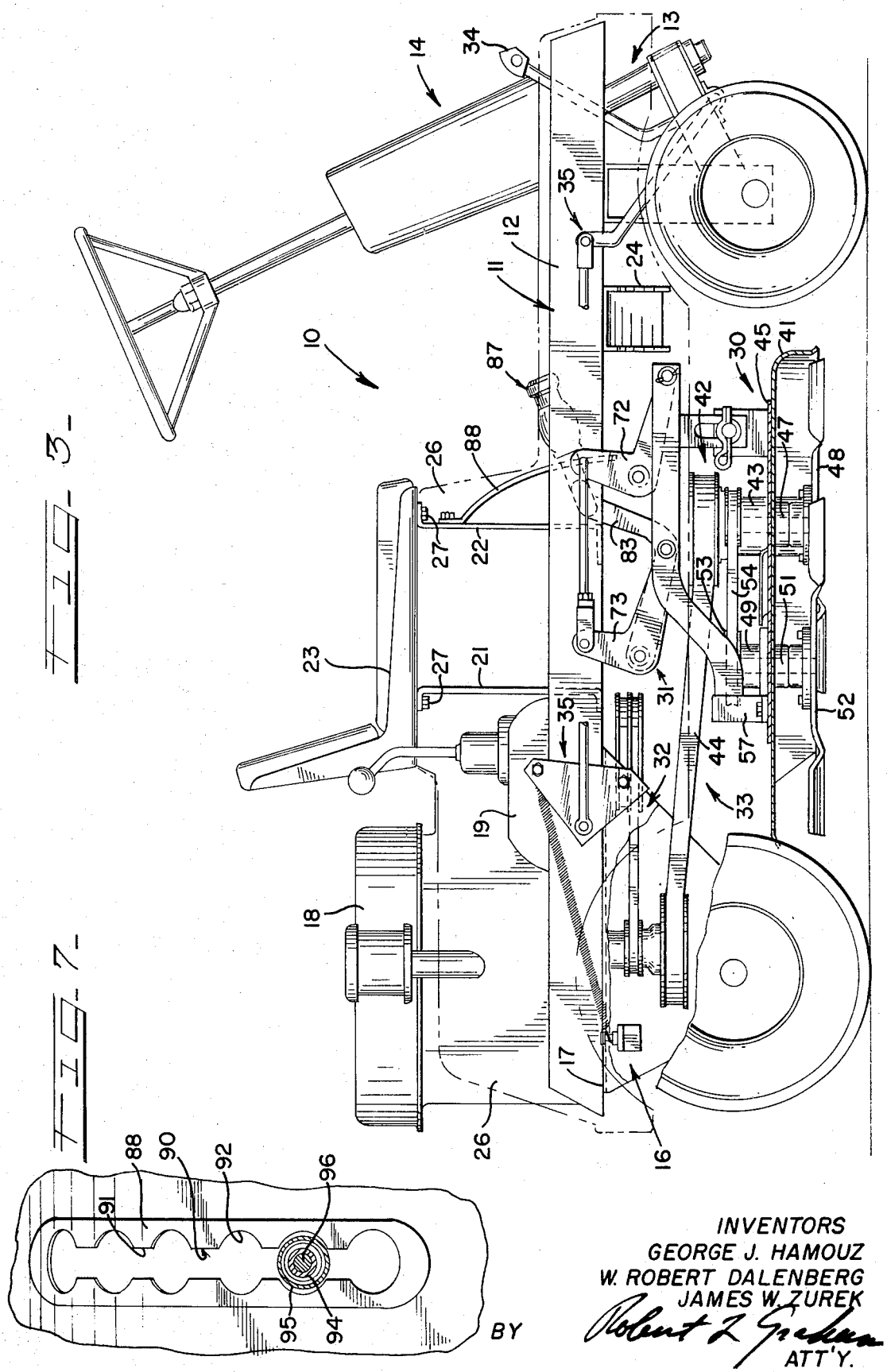

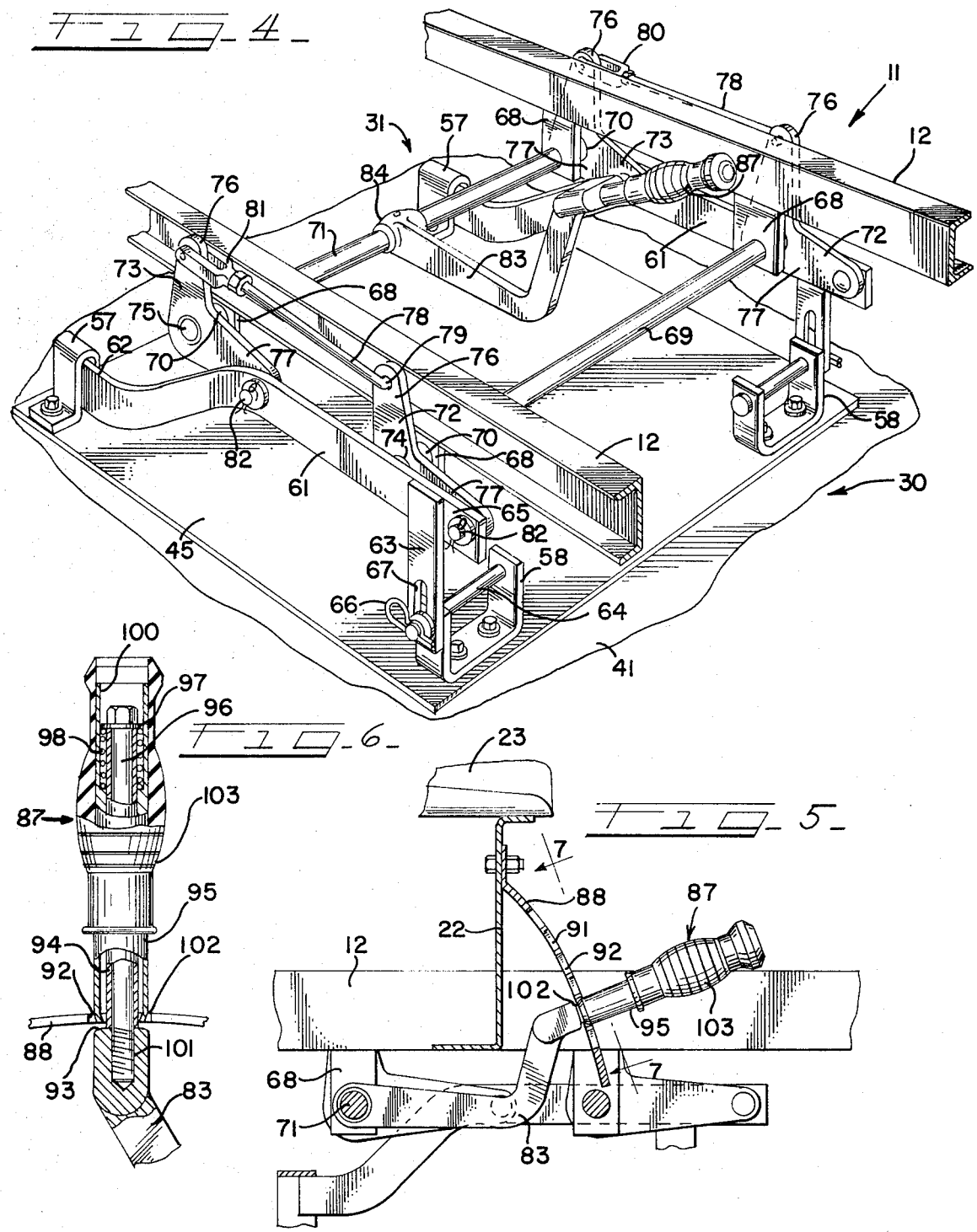

3,672,137

MOWER SUPPORT AND LIFT LINKAGE

This application is a streamlined continuation of application No. 725,725, filed May 1, 1968 and now abandoned.

BACKGROUND AND SUMMARY OF THE INVENTION

The present invention relates generally to riding mowers and more specifically to an implement suspension assembly for such mowers.

In the conventional riding mower designed specifically for residential use, a cutting unit is suspended below the mower chassis by means of a mounting assembly. In the more versatile variety of riding mowers, the mounting assembly includes an adjustability feature whereby the elevation of the cutting unit may be varied to accommodate a variety of grass and terrain conditions. The mounting assembly conventionally includes a linkage to which the cutting unit is attached and a lift lever manually operable upon the linkage to change the elevation of the cutting unit. The lifting capacity of the assembly is a function of the mechanical advantage of the lever and the lift geometry of the lever which, as defined herein, refers to the disposition of the lever relative to the operator. Heretofore, design emphasis has been directed at providing a sufficient mechanical advantage of the lift lever to give the assembly the required lift capacity, with very little consideration given to the lift geometry.

In contrast to this approach, the present invention proposes to provide a riding mower with a mounting assembly having a lift lever so disposed relative to the operator that the lift capacity of the assembly is a function of that disposition. A lift lever having the lift geometry contemplated herein permits adjustment of the cutting unit with little exertion by the operator.

A lift assembly constructed according to this invention is adapted to a riding mower having a longitudinally extending frame which supports at its front a steering mechanism and, at a point rearwardly spaced therefrom, an operator's seat. Laterally spaced foot stations are interposed between the steering mechanism and the seat. The lift assembly, which includes a parallel linkage from which is suspended the cutting unit, has a lift lever attached to the linkage at a point below the seat. The lever projects forwardly from the junction with the lift linkage terminating in a handle disposed forwardly of the seat and between the 2 foot stations. The lift lever is operable in a vertical plane upon the parallel linkage to adjust the elevation of the cutting unit. Thus it will be appreciated that in the normal operating position of the operator, the operator will be anchored at three points; namely, the operator's position on the seat and his position on the two foot stations. The anchoring force opposing the lift force exerted on the lever, being distributed at three points, will reduce the effort required by the operator to lift the lift lever. The lift advantage derived by this particular geometry permits a corresponding reduction in the mechanical advantage of the lever allowing for a shorter lever length.

DRAWINGS

FIG. 1 is a front perspective view of a lawn mower constructed according to this invention;

FIG. 2 is a rear perspective view of the lawn mower shown in FIG. 1;

FIG. 3 is a side elevation with portions cut away to illustrate the implement support assembly;

FIG. 4 is a perspective view of the support assembly shown detached from the mower;

FIG. 5 is an enlarged fragmentary view of the lift assembly shown in FIG. 4;

FIG. 6 is an enlarged view of the lift lever shown in FIG. 5 and shown partly in section; and FIG. 7 is a sectional view of the lift lever taken generally along line 7—7 of FIG. 5.

DESCRIPTION OF THE PREFERRED EMBODIMENT

Referring to FIGS. 1, 2, and 3, a riding mower 10 constructed according to this invention is seen to include a chassis 11 having a pair of laterally spaced and longitudinally extending channels 12, 12. The forward ends of the channels 12, 12 are interconnected by a front wheel mounting structure 13 which supports a steering assembly 14. A rear wheel mounting structure 16 includes a horizontal platform 17 which supports the vehicle engine 18 and transmission 19. Intermediate the fore and aft ends of the chassis 11 are a pair of upright, transverse plates 21 and 22 to which is bolted seat 23. A cross brace 24 interconnects the channels 12, 12 at a point longitudinally intermediate the steering assembly 14, and the seat 23. A fiber glass body 26 substantially covers the chassis and is anchored to the assembly at two locations: bolts 27 secure an intermediate portion of body 26 to plates 21 and 22, and bolts 28 secure a rear portion of the body 26 to the platform 17.

A cutting unit 30 is suspended underneath the chassis 11 by means of a mounting assembly designated generally as 31. Power is transmitted from the engine 18 to the transmission 19 by a V-belt drive shown generally as 32. A conventional chain drive (not shown) interconnects the transmission 19 and the rear traction wheels. A pair of clutch pedals 34, 34 disposed on opposite sides of the steering assembly 14 is operatively connected to the V-belt drive 32 through a linkage shown generally as 35. Details of the drive linkage 35 is disclosed in assignee's co-pending application Ser. No. 714,698 now U.S. Pat. No. 3,477,439, Nov. 11, 1969. Power is also transmitted from the engine 18 to the cutting unit 30 by means of a V-belt drive 33.

As best seen in FIG. 1 the fiber glass body 26 is shaped to form a foot well 36 intermediate the steering assembly 14 and the seat 23. The foot well 36 provides a pair of laterally spaced foot stations 37 and 38 particularly located so that the operator sitting on seat 23 normally will have his left and right feet positioned at foot stations 37 and 38, respectively. Cross member 24 provides support for the foot well 36.

The cutting unit 30 is conventional having an outer guard 41 of sheet metal construction and a mounting plate 45 secured to the top thereof. A double groove pulley 42 mounted on a spindle 43 which in turn is secured to the mounting plate 45 has trained thereover a V-belt 44 for receiving power from the engine 18. Pulley 42 is keyed to a shaft 47 which carries at its lower end a rotary cutting blade 48. Another spindle 49 mounted on plate 45 and laterally spaced from spindle 43 supports another pulley 53. Pulley 53 is mounted on the upper end of a vertical shaft 51 which carries at its lower end a second rotary cutting blade 52. A V-belt 54 trained about pulleys 53 and 42 transmits power from pulley 42 to pulley 53. The pulleys 53 and 42, in turn, transmit power through their respective shafts 51 and 47 to the cutting blades 52 and 48, driving them in timed relation.

As shown in FIG. 4, a pair of saddle brackets 57, 57 are bolted to the rear edge of the mounting plate 45. The brackets 57, 57 are laterally spaced and are in the form of inverted U's. A pair of brackets 58, 58 are bolted to a forward portion of the mounting plate 45. The forward mounting brackets 58, 58 are longitudinally aligned with the rear mounting brackets 57, 57 and provide the means for attaching the cutting unit 30 to the lift linkage described below.

Each pair of longitudinally aligned brackets 57 and 58 are suspended from a lift bar 61 as follows: one end 62 of the lift bar 61 is inserted into the inverted U bracket 57 and the opposite end 65 has depending therefrom a strap or lift bracket 63 which is connected to the bracket 58 by means of a pin connection 64. The pin 64 anchored to the bracket 58 passes through a longitudinal slot 67 formed in a strap 63 and is held in assembled relation by cotter pin 66. Thus it will be appreciated that the cutting unit 30 is suspended from the mounting assembly at four points and that two of the supporting points are interconnected by a lift bar 61 which is laterally spaced and aligned with another lift bar 61 interconnecting the other two points. The assemblage described above provides a quick hitch feature in the the removal of the cotter pins 66, 66 and the pins 64, 64 permits the cutting unit 30 to be moved rearwardly detaching it from the lift bars 61, 61.

The lift linkage 31 may be characterized as a parallel linkage having a pair of longitudinally aligned bellcranks disposed on each side of chassis 11. Each pair includes a front bellcrank lever 72 and a rear bellcrank lever 73. The front bellcrank lever 72 of each pair are rigidly connected as at 74 to opposite ends of a transverse shaft 69. A pair of tabs 68, 68 depending from channels 12, 12 at laterally spaced points journally support the shaft 69 and provides the means by which the front bellcrank assembly is swingable relative to the chassis 11. A rear bellcrank assembly comprising shaft 71 and bellcrank levers 73, 73 connected as at 75 to opposite ends of shaft 71 are similarly supported by laterally spaced tabs 68, 68 which depend from channels 12, 12. Each bellcrank 72, 72, 73, 73 is maintained at its proper spacing from channels 12, 12 by spacers 70 inserted around the ends of shafts 69 and 71 and interposed between the tabs 68 and the bellcranks. Thus it will be appreciated that the connections 74 and 75 define the fulcrums of bellcranks 72 and 73, respectively, and that the angularly disposed arms 76 and 77 of each bellcrank radiate outwardly therefrom.

A pair of adjustable pull rods 78, 78 interconnect arms 76, 76 of bellcranks 72, 73 on each side of the chassis 11 and thereby maintain the front and rear bellcranks 72, 73 in a parallel relationship. The entire lift assembly 31 is mounted to the chassis with one arm 76 of each bellcrank 72, 73 extending generally upwardly and the other arm 77 of each bellcrank 72, 73 extending generally forwardly.

Each of the lift bars 61, 61 is pinned to the outer ends of arm 77 of each of the longitudinally aligned bellcranks 72, 73.

A lever 83, operatively connected to the lift assembly 31 provides the means for manually changing the elevation of the cutting unit 30. The lever 83 includes at its rear end a hub 84 secured to an intermediate portion of the transverse shaft 71. The lever 83 projects forwardly from the hub 84 terminating in a handle portion 87 disposed in advance of the seat 23 and intermediate the foot stations 37 and 38 (see FIG. 1). Handle 87 is thusly disposed for convenient gripping for manual rocking of the shaft 71 which in turn pivots the bellcranks 72, 73 of the linkage 31 thereby imparting vertical movement to the suspended cutting unit 30. Counterclockwise rocking of the shaft 71 as viewed in FIG. 5 raises the mowing unit 30 and clockwise rocking of the same lowers the cutting unit 30. By being connected to the rearward shaft 71, the lever 83 is provided with a maximum moment arm.

The handle 87 projects generally radially outwardly from the shaft 71 and is disposed relative to the operator positioned on the seat 23 so that forces exerted by the operator on the lever 83 will be substantially perpendicular to the moment arm tending to turn shaft 71.

As best seen in FIG. 5 an arcuate guide plate 88 bolted to the upright plate 22 provides a means for selectively and lockingly positioning the parallel linkage 31 and hence the unit 30 at a variety of elevations. The guide plate 88 has formed therein a longitudinal slot 90 particularly configurated to provide a plurality of circular notches 92 (see FIG. 7). The minimum width of a slot 90 separating the notches 92 is denoted by the numeral 91.

The handle 87 is movably mounted on the lever 83 as follows: the lever 83 at its distal end has formed therein an outwardly facing shoulder 93 from which extends a hollow tube 94; an outer sleeve 95 encircles the tube 94 and is movably fastened thereto by means of an assembly comprising a bolt 96, a washer 97, and a compression spring 98. The compression spring 98 concentrically mounted on tube 94 has its opposite ends in engagement with washer 97 and an outwardly facing annular shoulder of a recess 100 formed in the outer end of sleeve 95. The bolt 96 threadably connected to the lever 83 as shown at 101 maintains the parts in assembled relation wherein the compression spring 98 urges the sleeve 95 inwardly. The sleeve 95 has an inner pinched end 102 which due to the bias of spring 98 normally abuts the shoulder 93.

The diameter of the sleeve 95 in relation to that of the notches 92 is such to provide a tight conformity so that with the sleeve 95 inserted in one of the notches 92 of the guide plate 88 the entire lift assembly 31 is locked in a fixed position. The diameter of the tube 94 is slightly less than the minimum width of section 91 of slot 90 so that upon movement of the sleeve 95 radially outwardly to a point wherein the end 102 clears the slot 90, the lever 83 and hence the entire assembly may be repositioned. It should be noted that the assembly 31 is normally in the locked position and that a positive force in a direction radially outwardly from the pivot axis defined by shaft 71 is required to unlock it. A grip 103 is mounted on the sleeve 95 giving the handle 87 a good gripping surface.

The procedure for changing the cutting elevation of the unit 30 will be described with reference to FIG. 1. The operator seated in the seat 23 and having his feet properly positioned at the laterally spaced foot station 37 and 38, with one hand grips the handle 87 disposed intermediate the foot stations 37 and 38 and at an elevation below that of the seat 23. Assuming that it is desired to raise the cutting elevation, the handle 87 is first moved radially outwardly and then generally upwardly. The lifting force exerted by the operator is generally in an upward direction, the vertical component of force representing the major portion of the lifting force. The vertical force is opposed by a supporting force transmitted through the operator's body to the chassis 11. Because of the lift geometry described herein, the supporting force is distributed at three points, namely, the seat 23 and the two foot stations 37, 38. The three points of supporting forces define an area through which the lifting force acts; thus the equilibrium of the operator will be little effected by the exertion of the lifting force on the lever 83. This permits an accurate change of the cutting elevation with a minimum exertion of effort by the operator. The operator, being anchored at three points maintains his balance at all times enhancing the safety of the machine.

What is claimed is:

1. In a riding lawn mower of the type having a longitudinally extending frame with longitudinally extending sides, an associated implement beneath said frame, the improvement comprising an assembly for displaceably suspending and selectively elevationally positioning said implement from the frame, said assembly comprising:

linkage means including a pair of lever members mounted on each side of the frame in longitudinally spaced relation;

means for suspending said implement from said linkage means to retain the same from substantial fore and aft and lateral movement relative to said linkage means;

said suspending means comprising, a generally horizontally extending rigid lift element on each side of the frame operatively interconnecting the respective lever members for conjunctive movement to effect a vertical translation of said lift element, and a pair of bracket members on said implement spaced lengthwise of each lift element and releasably coupled to said lift element and coacting therewith to provide a free moving vertical displacement of said implement relative to said lift elements, one of the brackets of each pair being U-shaped and loosely sleeved over the respective lift element and accommodating movement of the implement lengthwise and vertically with respect to the lift element and the other bracket of each pair comprising a vertically extending slot and a transverse pin extending through the slot and connected to the implement and accommodating free floating vertical translational and pivotal movement of the implement, said lift elements having free ends and said U-shaped brackets positioned over said free ends for easy removal and mounting with respect thereto, and;

lifting means selectively actuatable and operatively connected to move said lever members of said linkage means to effect a raising and lowering of said implement to a plurality of elevational positions through corresponding vertical translations of said lift elements.

* * * * *